United States Patent [19]

Priem et al.

[11] Patent Number: 5,129,065
[45] Date of Patent: Jul. 7, 1992

[54] APPARATUS AND METHODS FOR INTERFACE REGISTER HANDSHAKE FOR CONTROLLING DEVICES

[75] Inventors: Curtis Priem, Fremont; Chris Malachowsky, Santa Clara; Robert Rocchetti, Cupertino, all of Calif.

[73] Assignee: Sun Microsystems, Inc., Mountain View, Calif.

[21] Appl. No.: 428,236

[22] Filed: Oct. 27, 1989

[51] Int. Cl.⁵ .............................................. G06F 9/22
[52] U.S. Cl. ................................... 395/375; 395/325; 364/247; 364/240.8; 364/242.6; 364/231.8; 364/DIG. 1
[58] Field of Search ... 364/200 MS File, 900 MS File; 395/375, 325

[56] References Cited

U.S. PATENT DOCUMENTS

| | | |
|---|---|---|
| 4,038,642 | 7/1977 | Bouknecht et al. ............... 364/200 |
| 4,053,950 | 10/1977 | Bourke et al. ..................... 364/200 |
| 4,215,400 | 7/1980 | Denko ............................... 364/200 |
| 4,368,512 | 1/1983 | Kyu et al. ......................... 364/200 |
| 4,493,021 | 1/1985 | Agrawal et al. ................... 364/200 |
| 5,003,465 | 3/1991 | Chisholm et al. ................. 364/200 |

*Primary Examiner*—Thomas C. Lee
*Assistant Examiner*—Mehmet Geckil
*Attorney, Agent, or Firm*—Blakely Sokoloff Taylor & Zafman

[57] ABSTRACT

A method of initiating a write operation for a particular command from a first computer module through a system interface to a second computer module having data registers, and a status register which includes the steps of writing data to the data registers in the second computer module, and determining the status of the status register in the second computer module to cause the initiation of the particular command by which the reading the status of the data registers and issuing the particular command as separate steps are eliminated.

16 Claims, 5 Drawing Sheets

|  | MINIMUM CLOCK CYCLES | MAXIMUM CLOCK CYCLES | |
|---|---|---|---|
| READ STATUS | 5 | 12 | |
| WRITE DATA | 3 | 7 | |
| WRITE DATA | 3 | 7 | PRIOR ART |
| READ STATUS | 5 | 12 | |
| WRITE COMMAND | <u>3</u> | <u>7</u> | |
|  | 19 | 45 | |
| WRITE DATA | 3 | 7 | |
| WRITE DATA | 3 | 7 | EXAMPLE 1 |
| READ STATUS | 5 | 12 | 35% FASTER |
| WRITE COMMAND | <u>3</u> | <u>7</u> | |
|  | 14 | 33 | |
| WRITE DATA | 3 | 7 | |
| WRITE DATA | 3 | 7 | EXAMPLE 2 |
| READ STATUS | <u>5</u> | <u>12</u> | 73% FASTER |
|  | 11 | 26 | |

FIGURE 6

APPARATUS AND METHODS FOR INTERFACE REGISTER HANDSHAKE FOR CONTROLLING DEVICES

BACKGROUND OF THE INVENTION

1. Field of the Invention

This invention realates to computer bus interface systems and, more particularly, to apparatus and methods for minimizing the time necessary when controlling devices across a bus interface in a computer system.

2. History of the Prior Art

U.S. Pat. application Ser. No. 07/599,265, entitled APPARATUS AND METHOD FOR LOADING COORDINATE REGISTERS FOR USE WITH A GRAPHICS SUBSYSTEM UTILIZING AN INDEX REGISTER, Priem and Malachowsky, filed Oct. 16, 1990, describes a graphics accelerator adapted to process data as rapidly as information is capable of being accepted by a video frame buffer for a computer output display. Each stage of the graphics accelerator described therein must be capable of operating at as high a speed as possible in order to maintain the overall speed of the graphics accelerator. Consequently, the interface stage between the central processing unit and the graphics accelerator must be capable of operating at a speed which processes data at the aforementioned rate.

The steps that the central processing unit associated with the typical graphics accelerator of the prior art must accomplish to initiate any particular operation by which information is written to the computer output display are many. It must at least 1) check the status of the graphics accelerator to determine whether the data registers are ready to receive data, 2) write all of the data necessary to the registers of the graphics accelerator, 3) read the status register of the graphics accelerator to find out whether any exceptions exist which would make the operation impossible to accomplish, and 4) write the command to the graphics accelerator to initiate its operation. A typical wire operation for tow pieces of data, such as and X and a Y value of a point to be displayed, requires at least five individual accesses by the central processing unit of the graphics accelerator. It will be appreciated that such an operation will require a substantial amount of time, particularly because read accesses require a great deal of time.

If the interface between the central processing unit and the graphic accelerator requires such a period of time in order to accomplish the initiation of each operation, then the interface cannot possibly transfer data at a rate sufficient to match the bandwidth of the video frame buffer. Moreover, with so many individual accesses involved, if the interface time to initiate any particular operation is long there are a great number of instances in which another task might run in a multitasking system before the current task can finish. This can lead to problems of stale data and excessive context save/restore overhead.

SUMMARY OF THE INVENTION

It is, therefore, an object of the present invention to expedite the operation of a graphics accelerator.

It is another object of the present invention to provide apparatus and methods for using that appparatus to reduce the time necessary for initiating operations with a graphics accelerator.

It is another object of the present invention to reduce the time required to check the status of the graphics accelerator.

It is a more particular object of the present invention to provide apparatus and methods for accelerating the host interface register handshake between a central processing unit and a graphics accelerator.

These and other objects of the present invention are accomplished by a method of initiating an operation for a particular command from a first computer module through a system interface to a second computer module having data registers and a status register comprising the steps of writing data to the data registers in the second computer module, and reading the condition of the status register in the second computer module to cause the initiation of the particular command by which reading the status of the data registers and issuing the particular command as separate steps are elliminated.

These and other objects and features of the present invention will be better understood by reference to the detailed description of the invention which follows taken together with the drawings in which like elements are referred to by like designations throughout the several figures.

BRIEF DESCRIPTION OF THE DRAWINGS

FIG. 6 is a comparison of the minimum and the maximum number of clock cycles required for the different processes defined herein and a comparison of relative times.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
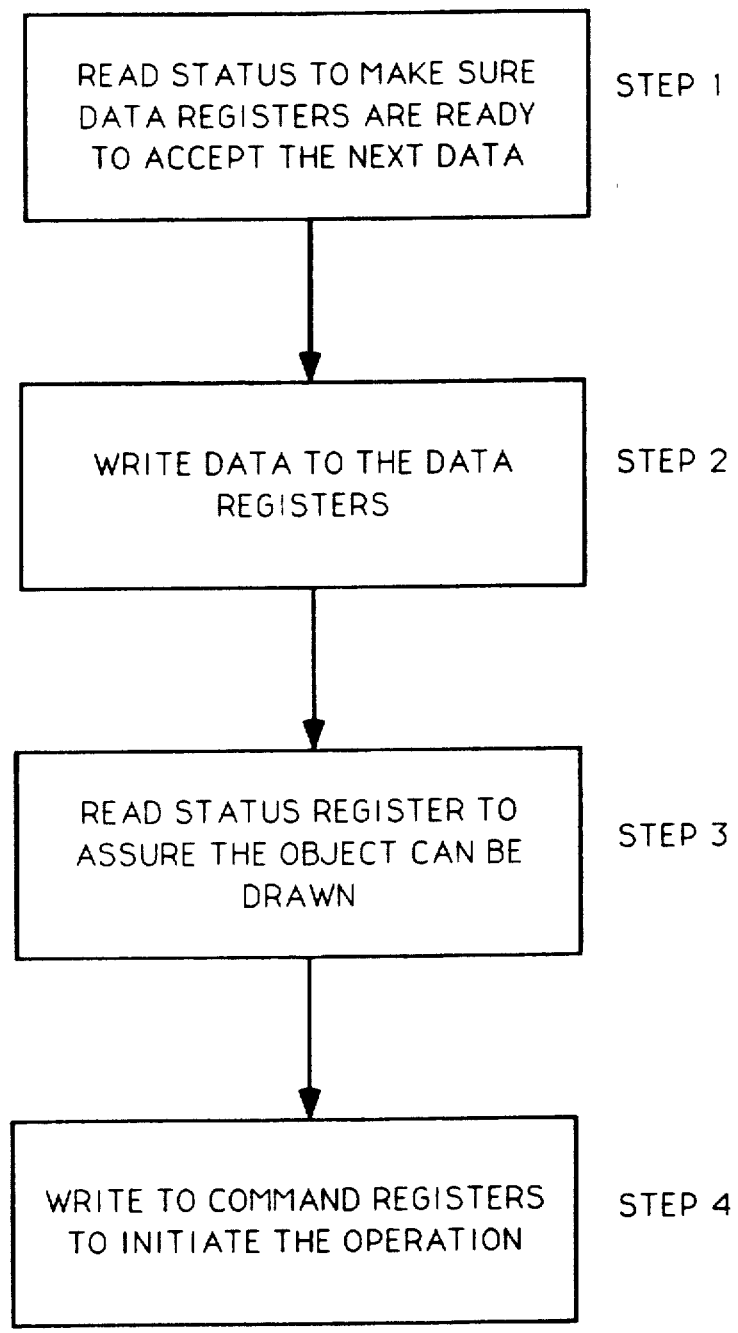
FIG. 1 illustrates a flow chart for the prior art method of initiating an operation across a computer bus to a register interface of a device.

As outlined above, the initiation of a typical write operation using a prior art graphics accelerator requires at least five accesses to the graphics accelerator by the central processing unit. These accesses are illustrated in the flow chart of FIG. 1 and include two read operations and three write operations. The read operations are required to determine whether the registers of the graphics accelerator are ready to receive data (step 1) and to discover the status of the graphics accelerator (step 3). The write operations are required to write the two pieces of data (step 2) necessary to determine a point on the computer output display (for a two-dimensional display) and to write the particular command to be accomplished (step 4).

A typical write operation at an interface may require from three to seven clock periods to accomplish the handshake required between systems for the operation. On the other hand, a typical read handshake operation in a computer bus interface system may require from five clock cycles to twelve clock cycles in order to accomplish the handshake operation. Moreover, certain read operations may require an unknown amount of time to accomplish.

Since both read and write handshake operations require a significant number of clock periods in the operation of a computer system (the read operations usually requiring substantially more time than the write operations), the number of read and write operations involved in the initiation of any particular operation at any computer interface limits the speed with which the particular operation can be initiated. This specification describes apparatus and methods for reducing the number of read and write accesses necessary to initiate any such operation.

Figure 2:
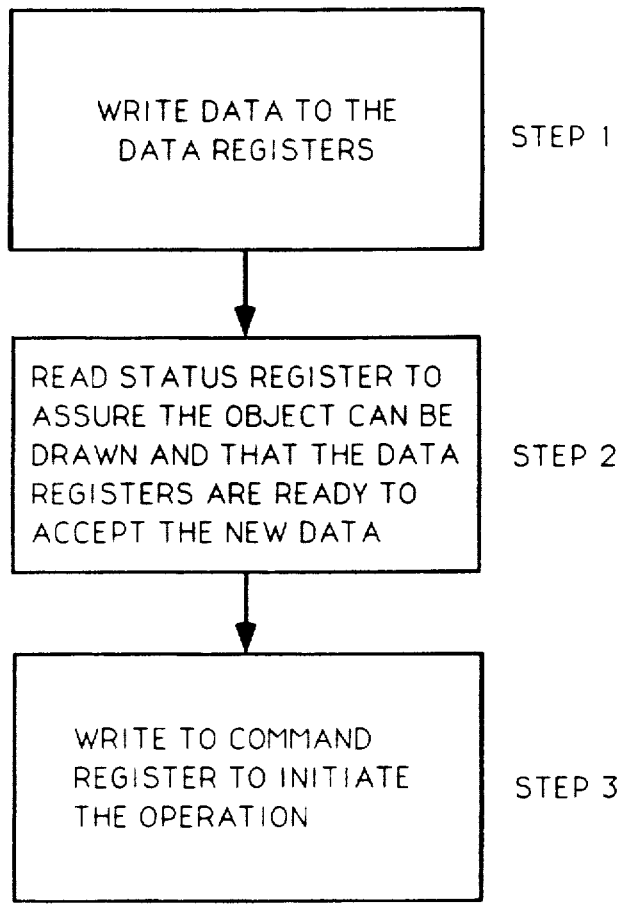
FIG. 2 illustrates a flow chart for a first method for reducing the time necessary to initiate an operation across a computer bus to a register interface of a device.

A first arrangement is illustrated in the flow chart of FIG. 2 for reducing the time necessary to initiate any operation. This first arrangement eliminates the first read operation required by the central processor in order to determine whether the registers of the graphics accelerator are able to receive the new data to be written. In order to accomplish this, an assumption is made that the graphics accelerator is, as a default, able to accept data transferred to it and that any data transferred will be utilized by the graphics accelerator. This implementation ignores the first step of the prior art method in which it is determined whether the registers of the graphics accelerator are full and instead writes the data to those registers presuming they are empty. If the particular object being written is a two-dimensional figure, such an operation requires two individual write accesses for the X and Y coordinates of the particular point to be written; if the information being written is three-dimensional, then three individual write accesses are necessary in order to write the three individual coordinates of the particular point.

Two concomitants exist from the assumption that the registers of the graphics accelerators are not full. First, the central processor must wait for the graphics accelerator to be in a condition where its registers are ready to accept more data (not full) in order for the optimization to operate correctly. Second, once the command has been written to the graphics accelerator by the processor, the command must be completed by the graphics accelerator so that its registers are not full and are ready to accept the next data to be written. In this embodiment, once a command is initiated the data is copied to an internal set of registers so that the data registers are ready to accept the next data. In the system described in the above-mentioned copending patent application, a number of pipelined register stages are available for this purpose.

In this implementation, the next step after writing the data to the registers (step 2) is to read the status of the graphics accelerator to make sure that the object can be drawn (that no exception exists) and that the data registers are ready to accept the next data. This requires one read access of a determinable period of time, an access which may be relatively rapidly accomplished in accordance with the arrangements described in U.S. Pat. No. 5,079,696, entitled APPARATUS FOR READ HANDSHAKE IN HIGH-SPEED ASYNCHRONOUS BUS INTERFACE, issued to Priem and Malachowsky, filed Sept. 11, 1989. Finally, the third step is to write the command to a command register.

As will be understood by those skilled in the art, this first implementation of the present invention requires three write operations (for two dimensional objects) and a single read operation thereby eliminating one read operation requiring at least five clock cycles and substantially enhancing the speed of operation of the bus interface. FIG. 6 offers a comparison of the relative times for the prior art operation and the first implementation of the invention. It will be seen that the elimination of the first read operation required by the prior art offers a 35% improvement in speed of operation.

Figure 3:
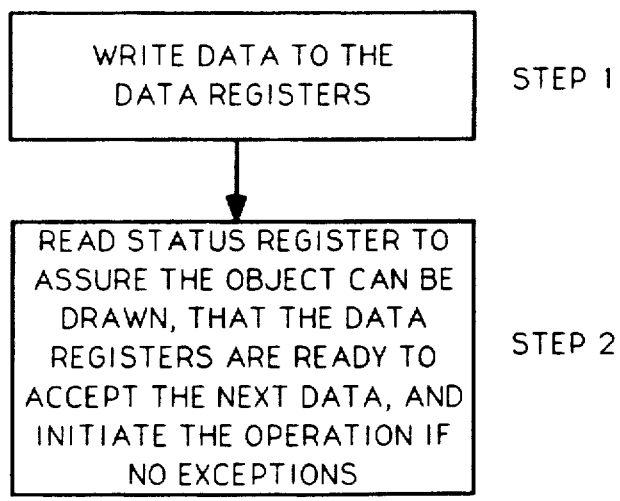
FIG. 3 illustrates a flow chart for a second method for reducing the time necessary to initiate an operation across a computer bus to a register interface of a device.

A second implementatin of the present invention is illustrated in the flow chart of FIG. 3. This implementation eliminates the step which requires that the command itself be written after the data is loaded in the data registers and the status has been determined. In this implementation, if the status is read and there is no exception, then the command is executed automatically. The graphics accelerator described in U.S. Pat. application Ser. No. 07/599,265, entitled APPARATUS AND METHOD FOR LOADING COORDINATE REGISTERS FOR USE WITH A GRAPHICS SUBSYSTEM UTILIZING AN INDEX REGISTER, Priem and Malachowsky, Oct. 16, 1990, is especially adapted to accomplish such an operation. This graphics accelerator includes individual status registers for a draw operation and for a block move operation. consequently, when one of these status registers is addressed and no exception exists, the next (command) step is known simply from the address of the status register which has been read; and the command may be executed without a sepatrate command being written.

The steps required to mplement the write operation are thus first to write the data to the data registers of the graphics accelerator (again, two write accesses are required for two-dimensional vertices while three write accesses are required for three-dimensional vertices), then to read the status of the graphics accelerator by reading all of the bits of the status register. If there is no exception, then the command is executed. If there is an exception then the command is not executed. However, this latter situation is the same situation that the system would be in were it to have used the prior art method for initiating each operation. Consequently, the lack of the step of writing the command to the graphics accelerator does not affect system operation when an exception occurs.

It will be understood that impiementing the initiation of an operation in this manner reduces the transaction to two write accesses and a single read access thereby substantially reducing the time required for implementing any particular operation. FIG. 6 offers a comparison of the relative times for the prior art operation and the second implementation of the invention.

Figure 4:
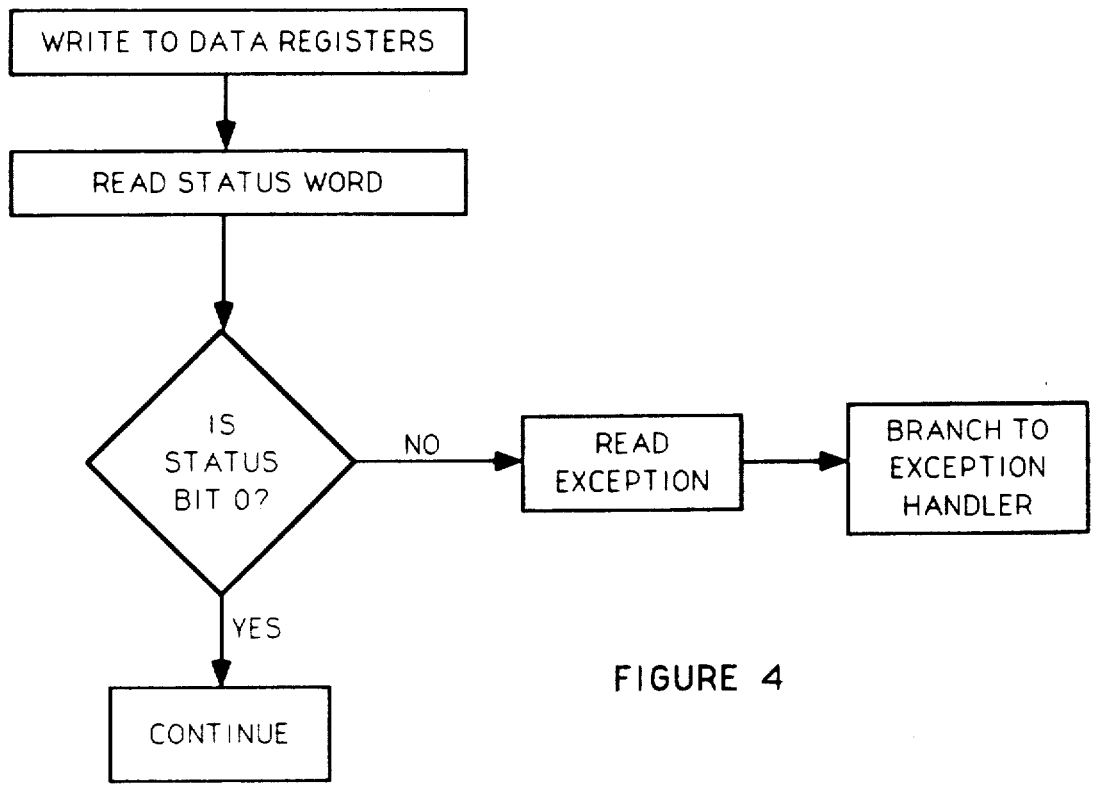
FIG. 4 illustrates a flow chart for a third method for reducing the time necessary to initiate an operation across a computer bus to a register interface of a device.

A third implementation (shown in FIG. 4) may be practiced by varying the read operation utilized for checking the status register from that typically found in the prior art. Normally the status register includes a number of bits which are set to indicate individual exceptions. For example, in the graphics accelerator referred to in the first above-mentioned co-pending patent application, the graphics accelerator does not handle operations which lie outside a particular test window area, does not handle operations lying outside particular clip window areas, does not handle the drawing of at least one form of quadrilateral, refers transformation overflows or underflows to the associated processor for solution, refers divide-by-zero operations from its transformation engine to the associated processor, and does not handle operations when its pipelines are full. Normally, each of these exceptions would be indicated by its own individual bits in the status register.

The usual operation required to read the status register of a prior art graphics accelerator requires reading all of these exception bits, loading a mask to determine a particular exception, ANDing together the bits of the mask and those in the status register to select the bits to be utilized, comparing the bits to be utilized (possibly with another mask), and, finally branching to the particular operation to be carried out in response to the exception.

Figure 5:
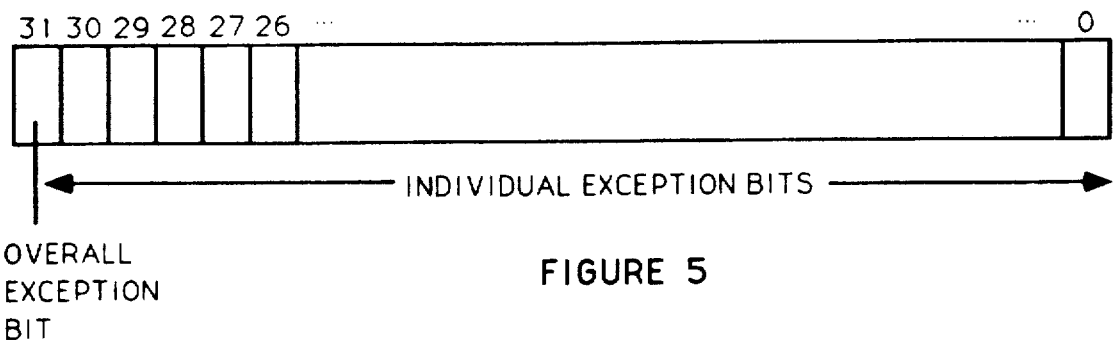
FIG. 5 illustrates a status register for a particular module operating at a computer bus interface in accordance with the invention.

In contrast to such prior art arrangements, the present invention uses a status register such as that illustrated in FIG. 5 which includes, in addition to exception bits for each of the individual exceptions, an overall exception bit held in the high order bit 31 of the status register. The graphics accelerator ORs each of the individual exception bits in each of the exception bits positions other than bit 31 and provides a one at bit 31 if any one or more exceptions exist. Consequently, a one in bit position 31 of the status register indicates that an exception exists. A zero in the bit position 31 of the status register, on the other hand, indicates that no exception exists and the operation may proceed without further checking. Processors commonly have instructions that test bits and then branch deterministically if the bits are set or not set. It is generally true that all processors have a test for positive and negative operands by looking at the high-order bit and doing a branch if the bit is "0" (positive) or "1" (negative). Since bit 31 is the high-order bit normally used in thirty-two bit computer systems to indicate whether a number stored in a register is negative or positive, most microprocessors are able to determine the status of that particular bit efficiently.

Consequently, all that is necessary for the read access of the status register utilizing the present invention is to read the status word, test bit 31 and if a zero is present indicating the status is positive, branch (branch on greater than or equal to zero) to the next operation to be accomplished. This substantially reduces the time required for processing the particular read access. If, on the other hand, a one exists in the status bit 31 indicating the status is negative, the entire status word has been read by the processor; and that status word need not be read again for the exception which exists. By simply sampling the particular bits of the status word, the processor utilizing the graphics accelerator is able to determine which exception exists and how to branch in response to that exception.

Figure 7:
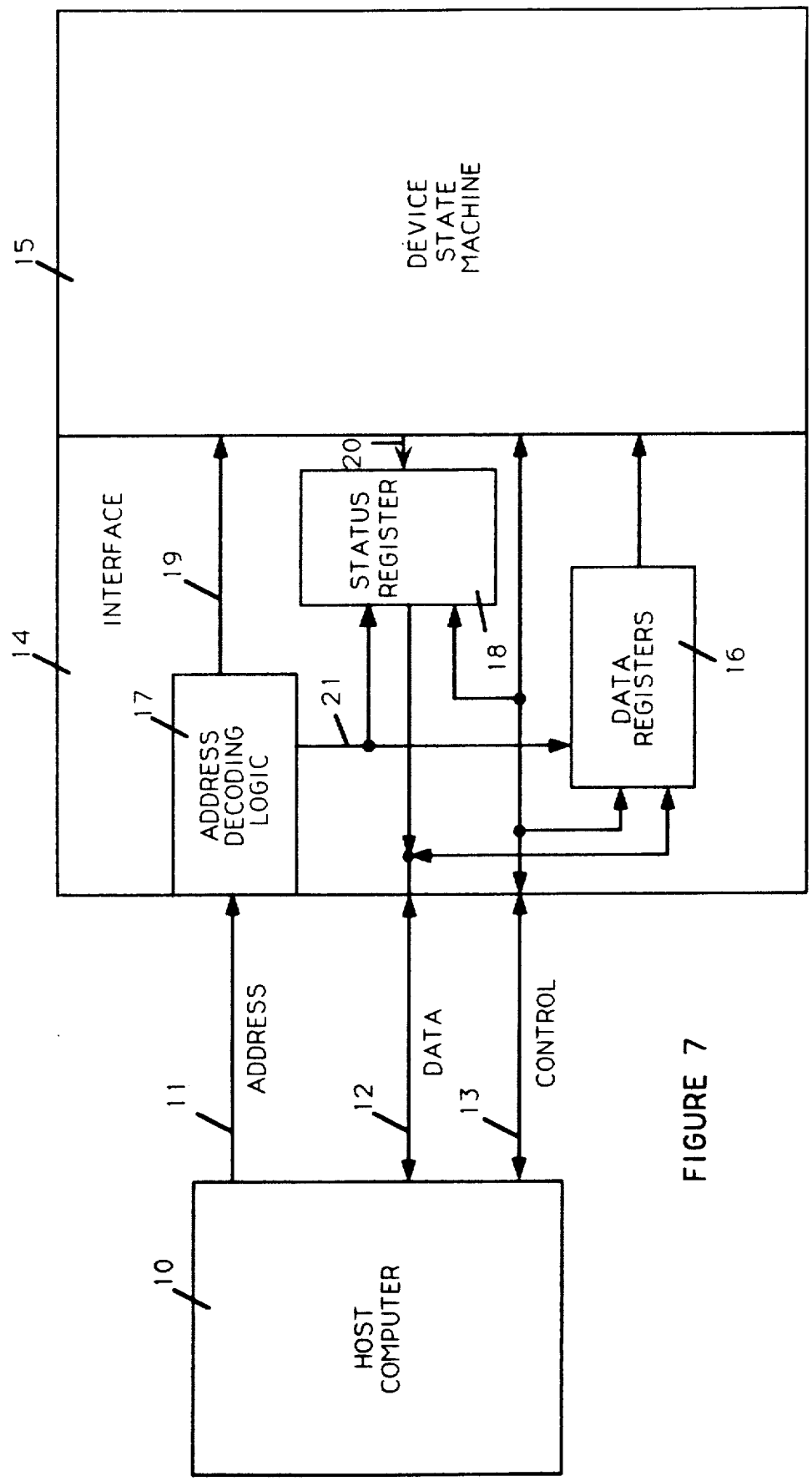
FIG. 7 is a block diagram illustrating a circuit configuration for carrying out the invention.

FIG. 7 illustrates in block diagram form an interface for accomplishing such an operation. The circuit includes a host computer 10 with which is associated a device state machine 15. The state machine 15 may take any of a number of different forms; for example, the state machine 15 may be a graphics accelerator such as that described in the patent application just referred to. Between the host computer and the state machine 15 is an interface logic circuit 14. The circuit 14 is joined to the host computer 10 by an address bus 11, a data bus 12, and control lines 13.

Address information is furnished on the address bus 11 to address decoding logic within the interface logic circuit 14. The decoded information is transferred to the state machine 15 on lines 19, and to a status register 18 and data registers 16 within the interface logic circuit 14 on line 21. The data bus 12 is connected to the status register 18 (only one status register is shown although the number of such registers is often greater) and to the data registers 16. The control signals on line 13 are furnished to the state machine 15, the data registers 16 and the status register 18. Both the data registers 16 and the status register 18 are connected to the device state machine 15.

In a write operation in which the host computer 10 writes information to the state machine 15, an address is generated by the host computer 10 and sent to the address decode logic 17. The address is decoded and placed on lines 19 and 21. Control signals on line 13 indicate to the status register 18 and the data registers 16 that the operation is a write operation. The information is then transferred from the host computer 10 on the data bus 12 to the appropriate one of the data registers 16 from which it may be transferred to the device state machine 15 for use in accordance with the above-described method.

In a read of the status register by the host computer 10, the address of the status register 18 sent by the host computer 10 is read by the address decoding logic 17. The signals on lines 19 and control lines 13 indicate that the status register 18 is being read by the host computer 10. The state machine 15 transfers the appropriate signals to the status register 18 over lines 20 to indicate the various status conditions (thirty-two bits of status information). The state machine 15 initiates the read of the status register 18 by transferring the data in status register 18 onto the data bus 12. This information is transferred to the host computer 10.

Thus, in accordance with the above-described method, if the control line 13 indicate that a read operation is occurring, and address lines 19 indicate a read from the status register 18, and the state machine 15 indicates that there in no exception, then the command will be executed by the device state machine 15.

It will be obvious to those skilled in the art that the utilization of this last implementation combined with the other optimizations above described accelerates the operation of initiating any particular operation. It does so by drastically reducing the length of time required to accomplish the particular read access of the status register. The maximum and minimum times illustrated in FIG. 6 for carrying out the particular optimizations detailed in this specification clearly illustrate the reduction of time accomplished by this invention.

Although various methods and apparatus have been described for optimizing the operation of a host interface register handshake in a computer system, various other extensions of the present invention and variations therein will be obvious to those skilled in the art without departing from the spirit and scope of the invention. For example, it will be clear that such an interface may be used with numerous peripherals associated with a central processing unit and is not limited to the interface with a graphics accelerator. The invention should therefore be measured by the claims which follow.

What is claimed is:

1. A method for initiating a particular command from a first computer module to a second computer module comprising the steps of:
   performing a write operation from said first computer module to said second computer module, said write operation transferring data from said first computer module to said second computer module;
   requesting a read status operation by said first computer module from said second computer module, said read status operation comprising the steps of:
      transmitting a control signal from said first computer module to said second computer module indicating to said second computer module that said read status operation was requested, and
      transmitting a request address from said first computer module to said second computer module, wherein said request address uniquely identifies said particular command,
   generating a status word in said second computer module in response to said read status operation request wherein said status word indicates whether any exceptions exist so as to render said particular command unexecutable by said second computer module;
   transferring said status word from said second computer module to said first computer module; and
   executing said particular command in said second computer module when said status word indicates that an exception does not exist, and when said control signal indicates that said status word has been requested by said first computer module, said particular command being identified by said address in said read status operation, said second computer module executing said particular command utilizing said data transferred to said second computer module, whereby initiation of said particular command as a separate step by said first computer module to said second computer module is eliminated.

2. A method for initiating a particular command from a first computer module to a second computer module as claimed in claim 1, further comprising the step of reading a single bit of said status word by said first computer module wherein said single bit of said status word indicates whether any exceptions exist so as to render said particular command unexecutable in said second computer module.

3. A method for initiating a particular command from a first computer module to a second computer module as claimed in claim 1, wherein said single bit is a high order bit of said status word.

4. A method for initiating a particular command from a first computer module to a second computer module as claimed in claim 1, further comprising the step of providing a system interface having address decoding logic, at least one status register, data registers, and a bus coupling said first computer module with said second computer module.

5. A method for initiating a particular command from a first computer module through a system interface to a second computer module as claimed in claim 4 wherein performing a write operation to transfer data from said first computer module to said second computer module comprises the steps of:
   transferring a write address from said first computer module to said address decoding logic;
   decoding said write address by said address decoding logic so as to select data registers and a status register;
   transferring said data from said first computer module to said data registers selected; and
   transferring a write control signal from said first computer module to said second computer module, said write control signal indicating to said second computer module that said write operation has occurred.

6. A method for initiating a particular command from a first computer module through a system interface to a second computer module as claimed in claim 4 wherein the step of requesting a read status operation by said first computer module from said second computer module further comprises the steps of:
   sending said request address from said first computer module to said address decoding logic;
   decoding said request address by said address decoding logic so as to generate a decoded request address;
   transferring said decoded request address from said address decoding logic to said second computer module wherein said decoded request address selects said particular command to said second computer module; and
   transferring said control signal from said first computer module to said system interface and to said second computer module, said control signal indicating to said second computer module that said status word has been requested by said first computer module.

7. A method for initiating a particular command from a first computer module through a system interface to a second computer module as claimed in claim 4 wherein transferring said status word from said second computer module to said first computer module comprises the steps of:

writing said status word generated by said second computer module to said status register indicated by said requesting address; and initiating a read of said status register by said second computer module by placing said status word located in said status register onto said data bus.

8. A method for initiating a particular command from a first computer module to a second computer module as claimed in claim 1 wherein generating said status word in said second computer module comprises the steps of:

performing a Boolean OR operation on all bits in said status word except a high order bit so as to generate an operand; and setting said high order bit of said status word when said operand of said Boolean OR operation indicates any bit in said status word is set.

9. A method for initiating a particular command from a first computer module through a system interface having data registers, at least one status register, and address decoding logic, to a second computer module, said method comprising the steps of:

performing a write operation from said first computer module through said system interface to said second computer module, said write operation comprising the steps of;

transferring a write address from said first computer to said address decoding logic, decoding said write address so as to select data registers and a status register, transferring said data from said first computer module to said data registers selected by said write address, requesting a read status operation by said first computer module from said second computer module, said read status operation comprising the steps of;

sending a request address from said first computer module to said address decoding logic, decoding said request address by said address decoding logic, transferring said request address decoded to said second computer module so as to select said particular command, transferring said control signal from said first computer module to said system interface and to said second computer module, said control signal indicating to said second computer module that said status word has been requested by said first computer module;

generating a status word in said second computer module in response to said read status operation request wherein said status word indicates whether any exceptions exist so as to render said particular command unexecutable by said second computer module;

transferring said status word from said second computer module to said first computer module comprising the steps of;

writing said status word generated by said second computer module to said status register indicated by said requesting address; and initiating a read of said status register by said second computer module by placing said status word located in said status register onto said data bus;

executing said particular command in said second computer module when said status word indicates that an exception does not exist, and when said control signal indicates that said status word has been requested by said first computer module, said particular command being identified by said address in said read status operation, said second computer module executing said particular command with said data transferred to said second computer module, whereby initiation of said particular command as a separate step by said first computer module to said second computer module is eliminated.

10. A method for initiating a particular command from a first computer module through a system interface having data registers, at least one status register, and address decoding logic, to a second computer module, as claimed in claim 9, further comprising the step of reading a single bit of said status word by said first computer module wherein said single bit of said status word indicates whether any exceptions exist so as to render said particular command unexecutable in said second computer module.

11. A method for initiating a particular command from a first computer module through a system interface having data registers, at least one status register, and address decoding logic, to a second computer module as claimed in claim 10 wherein said single bit is a high order bit of said status word.

12. a method for initiating a particular command from a first computer module through a system interface having data registers, at least one status register, and address decoding logic, to a second computer module as claimed in claim 9 wherein the step of generating said status word in said second computer module comprises the steps of:

performing a Boolean OR operation on all bits in said status word except a high order bit; and setting said high order bit of said status word when said operand of said Boolean OR operation indicates any bit in said status word is set.

13. An apparatus for initiating a particular command from a first computer module to a second computer module, said apparatus comprising:

write means coupled to said first computer module for transferring data from said first computer module to said second computer module;

request status means for initiating a status request by said first computer module to said second computer module, said request means comprising;

write control means coupled to said second computer module for indicating to said second computer module that said status request has been initiated, and request address means coupled to said second computer module for uniquely identifying said particular command, status means for generating a status word in said second computer module wherein said status word indicates whether any exceptions exist so as to render said particular command unexecutable in said second computer module;

transferring means coupled to said first computer module and said second computer module for writing said status word from said second computer module to said first computer module;

execution means coupled to said second computer module for executing said particular command in said second computer module when said status word indicates that an exception does not exist, and when said write control means indicates that said status word has been requested by said first computer module, said particular command being identified by said address in said read status operation, and said second computer module executing said particular command with said data transferred to said second computer module, whereby initiation of said particular command as a separate step by said first computer module to said second computer module is eliminated.

14. An apparatus for initiating a particular command from a first computer module to a second computer module as claimed in claim 13, further comprising status reading means for reading a single bit of said status word wherein said single bit of said status word indicates whether any exceptions exist so as to render said particular command unexecutable.

15. An apparatus for initiating a particular command from a first computer module to a second computer module as claimed in claim 14, wherein said single bit comprises a high order bit of said status word.

16. An apparatus for initiating a particular command from a first computer module to a second computer module as claimed in claim 13, further comprising a system interface having address decoding logic, at least one status register, data registers, and a bus coupling said first computer module with said second computer module.

* * * * *

UNITED STATES PATENT AND TRADEMARK OFFICE
CERTIFICATE OF CORRECTION

PATENT NO. : 5,129,065
DATED : July 7, 1992
INVENTOR(S) : Priem et al.

It is certified that error appears in the above-identified patent and that said Letters Patent is hereby corrected as shown below:

In column 1 at line 42, please delete " tow " and insert -- two --.

In column 1 at line 43, please delete " and " and insert -- an --.

In column 2 at line 18, please delete " elliminated " and insert -- eliminated --.

In column 5 at line 3, please delete " mplement " and insert -- implement --.

In column 8, claim 3 at line 14, please delete " 1 " and insert " 2 ".

Signed and Sealed this

First Day of April, 1997

Attest:

BRUCE LEHMAN

*Attesting Officer*  *Commissioner of Patents and Trademarks*